United States Patent [19]
Perego

[11] Patent Number: 4,789,253
[45] Date of Patent: Dec. 6, 1988

[54] AXIALLY PRE-TENSIONED ROLLING CONTACT BEARING ARRANGEMENT

[75] Inventor: Ambrogio Perego, Wettingen, Switzerland

[73] Assignee: BBC Brown Boveri AG, Baden, Switzerland

[21] Appl. No.: 147,727

[22] Filed: Jan. 25, 1988

[30] Foreign Application Priority Data

Jan. 30, 1987 [CH] Switzerland ............. 329/87

[51] Int. Cl.⁴ .................. F16C 27/00; F16C 33/66
[52] U.S. Cl. ............................. 384/517; 384/99; 384/535
[58] Field of Search ......... 384/99, 517, 535, 563, 384/581

[56] References Cited

U.S. PATENT DOCUMENTS

| 4,676,667 | 6/1987 | Komatsu | 384/517 X |
| 4,721,398 | 1/1988 | Miyashita | 384/99 |

FOREIGN PATENT DOCUMENTS 3229128  2/1983  Fed. Rep. of Germany.
3531313  3/1986  Fed. Rep. of Germany.
341820   1/1931  United Kingdom.
1208133  10/1970 United Kingdom.

Primary Examiner—Stuart S. Levy
Assistant Examiner—Thomas R. Hannon
Attorney, Agent, or Firm—Burns, Doane, Swecker & Mathis

[57] ABSTRACT

The rolling contact bearings (12, 13) of an exhaust gas turbocharger shaft (10) are seated in axially displaceable damping bushes (14, 15) and are axially clamped by hydrodynamic forces, these forces increasing with the rotational shaft speed. The forces are produced by lubricating oil flowing in through oil feed holes (29, 30) in a bearing bush (5) into annular ducts (31, 32) between this bearing bush (5) and the damping bushes (14, 15), which takes plase as a result of the banking up of the lubricating oil in the annular ducts (31, 32) in front of the oil feed holes (33, 34) in the damping bushes (14, 15). A part of the lubricating oil passes through oil feed holes (24, 25) in the bearing bush (5) into very narrow annular gaps between the cylindrical circumferential faces of larger bush parts (16, 17) of the damping bushes (14, 15) and holes in the bearing bush (5). These lubricating oil fractions in the annular gaps damp vibrations of the shaft and of the bearing arrangement excited by the operational loading.

3 Claims, 2 Drawing Sheets

AXIALLY PRE-TENSIONED ROLLING CONTACT BEARING ARRANGEMENT

The present invention relates to an axially pretensioned rolling contact bearing arrangement for a shaft in a casing, in which arrangement the shaft exhibits at at least one of its two shaft ends a disk-shaped axially symmetric overhung component and the two rolling contact bearings arranged inwards of the shaft ends, are axially rigidly clamped to the shaft with their inner race and with their outer race are seated in one damping bush each which, in turn, are axially displaceably supported in the interior of a bearing bush, mounted in a bearing casing, at its two ends, furthermore with ducts for feeding lubricating oil to the rolling contact bearings and away from them back into an oil sump of a lubricating oil circuit.

DISCUSSION OF BACKGROUND

The rolling contact bearing arrangement according to the invention is mainly suitable for the dynamically stable support of shafts driven at high revolutions, for example in exhaust gas turbochargers the rotors of which rotate, for example, at up to 60,000 revolutions per minute. To achieve stable quiet running of the shaft which carries at its two ends an overhung turbine wheel or compressor wheel, and in order to avoid uncontrolled conditions of slip in the rolling contact bearings, which are usually angular contact ball bearings, the latter are axially pre-tensioned. For this purpose, helical or cup springs, arranged coaxially with respect to the shaft, by means of which the inner races of the bearings are clamped with respect to the outer races over the balls are used in most cases.

To maintain this pre-tension for any operating condition, it must not be too small which results in a not insignificant bearing dissipation. It impairs the life of the ball bearings and the accelerating up of the rotor with an increase in vehicle load in traveling operation.

In a bearing arrangement of a turbocharger rotor, described in German Offenlegungsschrift 3,531,313, which is mentioned there as belonging to the prior art, the two ball bearings are axially pre-tensioned by a helical spring which coaxially surrounds the bearing shaft and which is supported on two bushes which accommodate the ball bearings and which are floatingly seated with radial play in the hole in the bearing casing and which the shaft bearing is accommodated. In operation, the radial play between the said bushes and the hole accommodating them is taken up by the bearing lubricating oil which is under pressure, as a result of which a position of the shaft axle is to be achieved which has limited resiliency but is stable.

The fact that the two bushes accommodating the ball bearings are separated from one another and can therefore move independently of one another, has the disadvantage, according to the German Offenlegungsschrift mentioned, that the stability of the rotational movement and the position of the turbocharger shaft is not ensured to the desired extent. In addition, the axial pre-tensioning force in this embodiment is intended to be quite great, the consequence of a reduction in the bearing life and of the mechanical efficiency.

It is therefore proposed as a remedy in this document, to provide a single-part bush for the two ball bearings. A twisting of the bush is prevented by a pin which loosely engages the bush and the bearing casing and lubricating oil reaches the interior of the bush through plays between the two front faces of the bush and the bearing casing hole and through a hole in the bush pointing towards the turbine-side ball bearing, and vaporizes to become a lubricating oil mist which ensures reliable lubrication of the two ball bearings. The oil is also sprayed through the said hole against the more heat-stressed turbine-side ball bearing which, as a result, is also cooled.

Apart from this and from a more stable shaft position due to the single-part bush, however, the subjectmatter of this German Offenlegungsschrift also has the disadvantage of axial pre-tensioning of the two ball bearings which, just as in the case of the construction with two bushes initially mentioned, continuously acts in the same strength and also results in not inconsiderable bearing friction losses.

SUMMARY OF THE INVENTION

The last-mentioned disadvantage of the known construction of bearing arrangements for high-speed rotors and similar machine parts mentioned is to be avoided by means of the bearing arrangement according to the invention in order to improve the mechanical efficiency. For this purpose, a constant loading of the ball bearings by means of springs is dispensed with and an axial pre-tension is achieved only by utilizing the hydraulic pressure effects generated by the lubricating oil pressure and dependent on rotational speed. As a result, an axial pre-tension is obtained which increases with increasing rotational speed, in which arrangement this pre-tension is equal to zero at standstill and is much less in the lower range than in the case of the abovementioned construction types having a constantly large pre-tensioned and, as a result, a correspondingly greater frictional dissipation even at low rotational speeds. Thus, the rotational speed-dependent variation of the pre-tension leads to an at least approximately ideal operational behavior of the bearing since the bearing pretensioned increases with the rotation speed, and as result, the disadvantages of the known bearing arrangements initially mentioned are avoided.

The axially pre-tensioned rolling contact bearing arrangement according to the invention is characterized by the fact that the damping bushes are essentially bodies consisting of two bushes of different outside diameter, with one larger bush part each which accommodates the outer race of the rolling contact bearing concerned and is seated with radial play in the bearing bush so that the outer surface of this larger bush part delimits, together with the hole of the bearing bush accommodating it, an annular space and one smaller bush part each which, with a circular cylindrical outer surface, is displaceably seated in a hole of the bearing bush and with the latter, delimits an annular duct, which smaller bush parts each exhibit a hole which, together with the shaft, delimit annular gaps which connect the rolling contact bearing spaces with the duct for lubricant removal, that the duct for feeding lubricating oil to the rolling contact bearings communicates via oil feed holes in the bearing bush with the abovementioned annular spaces between the outer surfaces of the larger bush parts and the bearing bush, that the duct furthermore communicates via oil feed holes in the bearing bush with the annular ducts, and that these annular ducts are in conductive connection with the rolling contact body space of the rolling contact bearings via oil feed holes in the damping bushes, the cross-section of the oil feed holes in the damping bushes being smaller than the cross-section of the oil feed holes in the bearing bush.

BRIEF DESCRIPTION OF THE DRAWINGS

In the text which follows, the invention is described in greater detail with reference to an illustrative embodiment shown in the drawings, in which.

DESCRIPTION OF THE PREFERRED EMBODIMENTS

Figure 1:
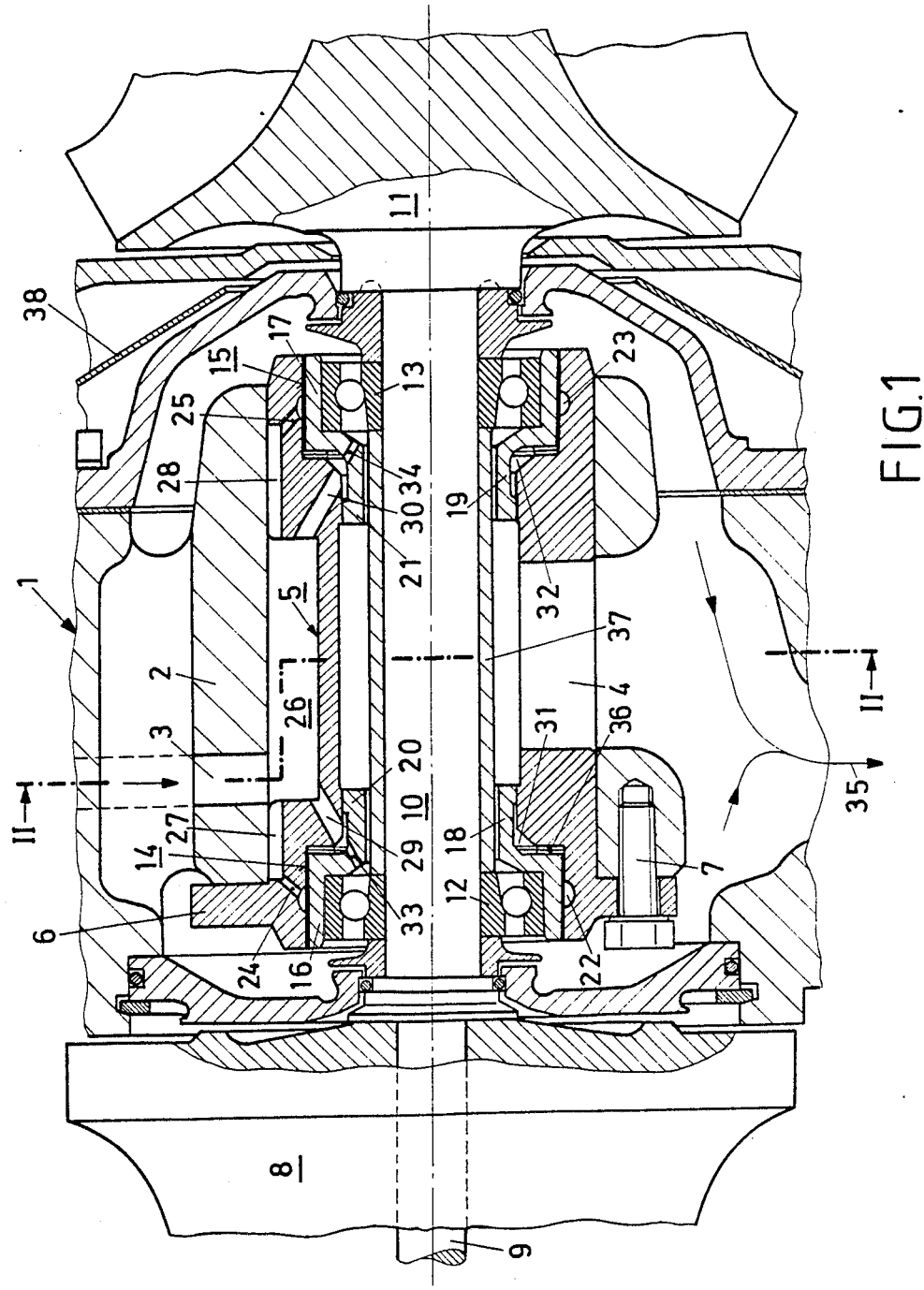
FIG. 1 shows a longitudinal section through an exhaust gas turbocharger with a rolling contact bearing arrangement according to the invention.
Figure 2:
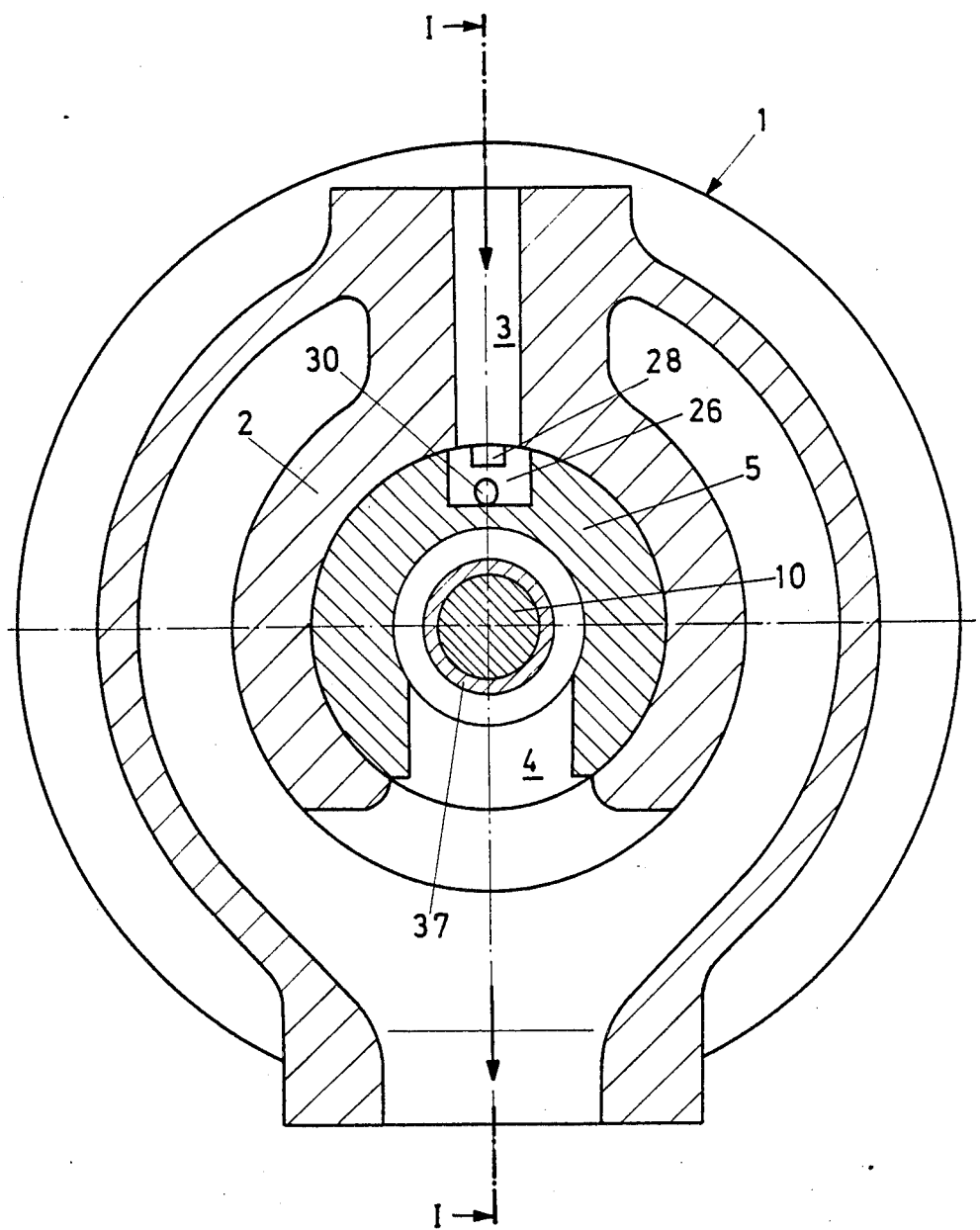
FIG. 2 shows a cross-section of this turbocharger according to the sectional line II—II drawn in FIG. 1.

In FIG. 1, the casing 1 of the exhaust gas turbocharger is represented only to the extent necessary for understanding the invention. In its interior, it contains a bearing casing 2 which exhibits in its upper part an oil feed hole 3 and in its lower part an oil drain duct 4. The bearing casing 2 accommodates a bearing bush 5 which extends over the entire length of the bearing casing 2 and exhibits on one side a flange 6 by means of which it is attached by screws 7 on the front face of the bearing casing 2 on the side of the diagrammatically represented compressor wheel 8. The compressor wheel 8 is seated on a shaft journal 9 of a turbocharger shaft 10 on the other end of which the turbine wheel 11 is connected by welding to the shaft 10.

In the present case, the rolling contact bearings are two angular contact ball bearings 12 and 13 which are seated in identically designed damping bushes 14 and 15, respectively. These are stepped in diameter, the larger bush part 16 and 17, respectively, accommodating the ball bearing 12 and 13 concerned whilst the respective bush part 18 and 19 with smaller diameter adjoins the turbocharger shaft 10 with play and is seated with a collar 20 or 21, provided at its free end, with sliding fit in a hole in the bearing bush 5. In contrast, the larger bush parts 16, 17 of the two damping bushes 14 and 15 are seated with significant play in the holes in the bearing bush 5 intended for them. These holes are provided at approximately the center of their axial length with annular grooves 22, 23 which are in conductive connection via oil feed holes 24 or 25 to a cross-sectionally approximately rectangular oil distribution duct 26 in the bearing bush 5 which is supplied with lubricating oil via the oil feed hole 3, and via cross-sectionally also rectangular lubricating oil grooves 27 and 28 in the bearing bush 5. In addition, one oil feed hole 29 and 30 each branch off the oil distribution duct 26 at the two ends of the bearing bush 5, by means of which feed holes the oil, which is under pressure in operation, passes into an annular duct 31 and 32 between the bearing bush 5 and the damping bush 14 and 15 concerned and through at least one further oil feed hole 33, 34 each in the damping bushes 14 and 15 to the balls and running tracks of the ball bearings 12, 13.

The oil flowing via the holes 29 and 30 into the annular ducts 31, 32 is banked up there in the annular ducts 31 and 32 before it passes through the oil feed holes for lubrication into the bearings 12, 13. Since the two damping bushes 14, 15 are displaceably seated in the bearing bush 5, they and with them the outer races in both ball bearings are pressed in the direction of the compressor or turbine wheel by the oil banked up in the annular ducts. Thus, existing ball bearing plays are compensated, the axial pre-tensioning force increasing with increasing turbocharger rotational speed and correspondingly increasing oil delivery flow according to hydraulic laws.

From the annular ducts 31, 32, the oil passes, as mentioned, through the oil feed holes 33, 34, into the ball bearings for lubrication and, from there, as indicated by the flow arrow 35, into the oil sump and back into the oil circuit.

Another part of the lubricating oil supplied from above passes through the oil feed holes 24, 25 in the bearing bush 5 into the annular grooves 22 and 23 in the area of the cylindrical outer face of the larger bush parts 16, 17 of the damping bushes 14 and 15. Between these outer surfaces and the corresponding holes in the bearing bush 5, a noticeable play, which cannot be represented in the drawing, exists which is taken up in operation by the oil flow distributing itself from the annular grooves 22, 23 and, as a result, damps the shock loads occurring in operation. The oil emerging at the front faces of the damping bushes 14, 15 also runs into the oil sump via the ball bearings and back into the lubricating oil circuit.

The spacing disks 36 in the area of the annular ducts 31, 32 between the damping bushes 14, 15 and the bearing bush 5 are used for setting an axial minimum play of the ball bearings in cold condition. In the operationally hot condition, the shaft 10 with the two inner ball bearing races and the spacing sleeve 37 located between these is heated most of the elements located in the casing, the axial play occurring being canceled by the oil pressure in the annular ducts 31, 32 as described. Between the turbine and the casing 1, a heat shield 38 is arranged in order to keep the heating of the casing and of its content as low as possible.

What is claimed as new and desired to be secured by Letters Patent of the United States is:

1. Axially pre-tensioned rolling contact bearing arrangement of a shaft (10) in a casing (1), in which arrangement the shaft (10) exhibits at at least one of its two shaft ends a disk-shaped axially symmetric overhung component (8, 11) and the two rolling contact bearings (12, 13), arranged inwards of the shaft ends, are axially rigidly clamped to the shaft (10) with their inner race and with their outer race are seated in one damping bush (14, 15) each which, in turn, are axially displaceably supported in the interior of a bearing bush (5), mounted in a bearing casing (2), at its two ends, furthermore with ducts (3, 4) for feeding lubricating oil to the rolling contact bearings (12, 13) and away from them back into an oil sump of a lubricating oil circuit, wherein the damping bushes (14, 15) are essentially bodies consisting of two bushes of different outside diameter, with one larger bush part (16, 17) each which accommodates the outer race of the rolling contact bearing (12, 13) concerned and is seated with radial play in the bearing bush (5) so that the outer surface of this larger bush part (16, 17) delimits, together with the hole of the bearing bush (5), accommodating it, an annular space, and one smaller bush part (18, 19) each which, with a circular cylindrical outer surface, is displaceably seated in a hole of the bearing bush (5) and, with the latter, delimits an annular duct (31, 32), which smaller bush parts (18, 19) each exhibit a hole, which, together with the shaft (10), delimit annular gaps which connect the rolling contact bearing spaces with the duct (4) for lubricant removal, the duct (3) for feeding lubricating oil to the rolling contact bearings (12, 13) communicates via oil feed holes (24, 25) in the bearing bush (5) with the abovementioned annular spaces between the outer surfaces of the larger bush parts (16, 17) and the bearing bush (5), the duct (3) furthermore communicates via oil feed holes (29, 30) n the bearing bush (5) with the annular ducts (31, 32), and these annular ducts (31, 32) are in conductive connection with the rolling contact body space of the rolling contact bearings (12, 13) via oil feed holes (33, 34) in the damping bushes (14, 15), the cross-section of the oil feed holes (33, 34) in the damping bushes (14, 15) being smaller than the cross-section of the oil feed holes (29, 30) in the bearing bush (5).

2. Rolling contact bearing arrangement as claimed in claim 1, wherein the bearing bush (5) exhibits an oil distribution duct (26) which communicates with the oil feed hole (3) of the bearing casing (2) and from which lubricating oil grooves (27, 28) branch off to the oil feed holes (24, 25) for the annular spaces between the outer surfaces of the abovementioned larger bush parts (16, 17) and the bearing bush (5), these oil feed holes (24, 25) open into annular grooves (22, 23) in the bearing bush (5), which annular grooves (22, 23) surround the abovementioned annular spaces, and the oil feed holes (29, 30) which open into the annular ducts (31, 32) between the bearing bush (5) and the outer surface of the smaller bush parts (18, 19) of the damping bushes (14, 15) also branch off from the oil distribution duct (26).

3. Rolling contact bearing arrangement as claimed in claim 1, wherein the rolling contact bearings are angular contact ball bearings (12, 13).

* * * * *